Sept. 21, 1937.  R. W. FAULHABER  2,093,911
SADDLE
Filed Aug. 28, 1935
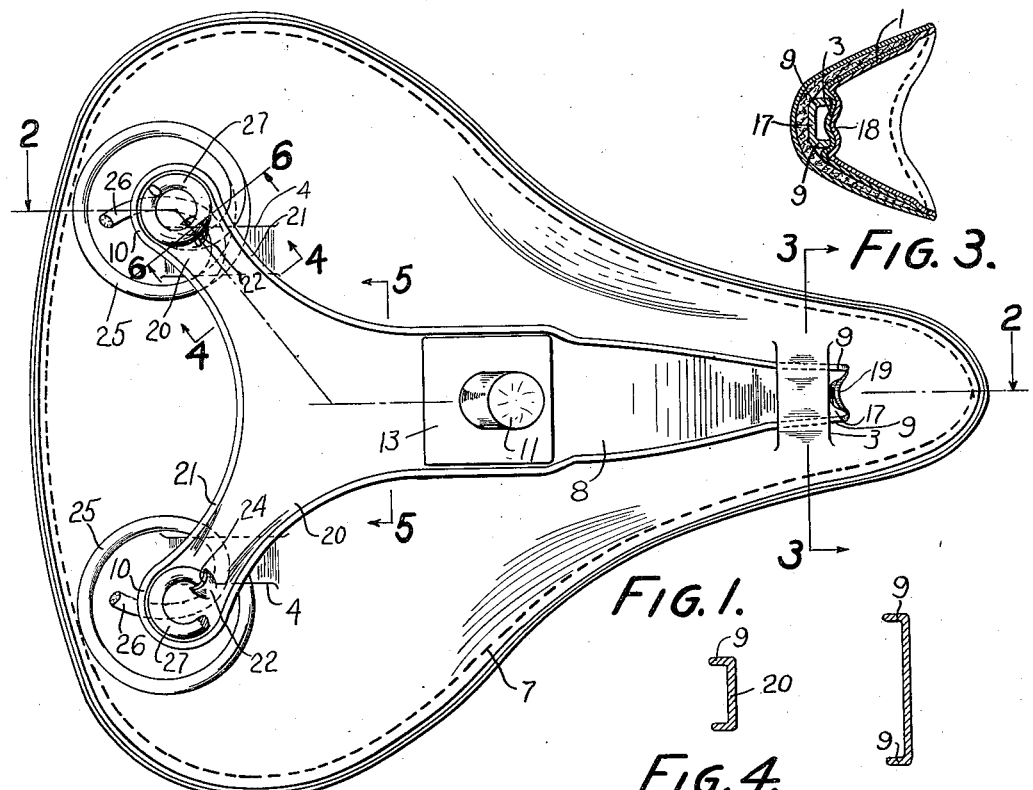
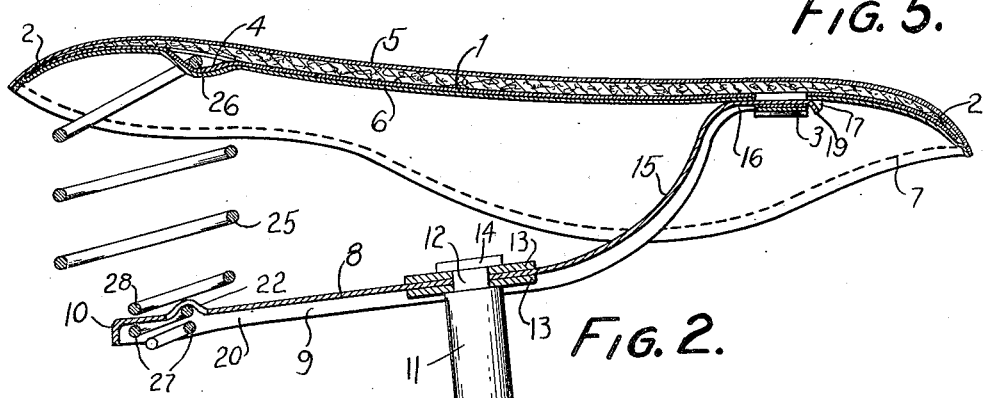
INVENTOR.
Roland W. Faulhaber.
BY Slough and Canfield
ATTORNEYS.

Patented Sept. 21, 1937

2,093,911

UNITED STATES PATENT OFFICE 2,093,911

SADDLE

Roland W. Faulhaber, Elyria, Ohio, assignor to The Troxel Manufacturing Company, Elyria, Ohio, a corporation of Ohio Application August 28, 1935, Serial No. 38,226

10 Claims. (Cl. 208—15)

This invention relates to saddles and particularly saddles for cycles of the bicycle and velocipede, etc., type.

Saddles of this general class have been made having a rigid base or seat portion and a reach member thereunder hingingly connected to the forward or pommel end of the seat and supporting the rearward or cantle portion of the seat upon springs, the saddle being mounted upon the bicycle or the like by attaching an intermediate portion of the reach member thereto. It is to this general class of saddles that the present invention relates.

Among the objects of the invention are:

To provide generally an improved saddle of this class.

To provide a saddle of the class referred to, having improved reach member construction.

To provide a saddle of this class having an improved connection between the reach member and the seat.

To provide an improved construction connecting the reach member with the springs.

To provide an improved saddle construction whereby the springs may be connected to the seat and to the reach member without the use of auxiliary attaching means such as bolts or rivets, and whereby the connection may be permanently maintained by the inherent resilience of the springs.

To provide a saddle of the class referred to having a spiral type spring and in which opposite end portions of the spring may be attached and secured to the seat and reach member respectively by a winding movement of the spring ends and retained in secured connection by the resistance of the spring to unwinding.

Other objects will be apparent to those skilled in the art to which my invention appertains.

My invention is fully disclosed in the following description taken in connection with the accompanying drawing in which:

Fig. 1 is a bottom plan view of a saddle embodying my invention;

Fig. 2 is a longitudinal sectional view taken from the plane 2—2 of Fig. 1;

Fig. 3 is a cross-sectional view taken from the plane 3—3 of Fig. 1;

Figs. 4 and 5 are, respectively, fragmentary sectional views taken from the planes 4—4 and 5—5 of Fig. 1;

Fig. 6 is a fragmentary cross-sectional view taken from the plane 6—6 of Fig. 1.

Referring to the drawing, I have shown at 1 the main frame of the saddle seat preferably formed from sheet metal, and being generally of campanulate form with a curved depending flange peripherally thereof, as shown at 2.

A loop 3 is cut and pressed downwardly out of the sheet metal of the frame 1 in the pommel portion thereof, and a pair of transversely spaced loops 4—4 are similarly provided in the rear or cantle portion of the saddle frame 1.

The saddle frame 1 is covered by an upper or top cover 5 and a lower or inner cover 6, which may be made from any suitable material such as leather, artificial leather, fabric or the like, secured upon the frame 1 by a row of stitching through the peripheral edges of the covers, and peripherally outwardly of and enclosing therewithin the frame 1. A layer of cushioning material may be provided between the top cover 5 and the frame 1; and the cover may have a loop portion covering the metal loops above described.

The reach member indicated generally at 8 is formed from sheet metal generally of Y-form as viewed in plan in Fig. 1, and having a depending flange 9 peripherally thereof.

The ends of the legs of the Y-form terminate in cup portions 10—10. The intermediate or stem portion of the Y-form has secured thereto a post 11 by which the saddle may be mounted upon the cycle or other vehicle, the preferred form of securing the post 11 to the reach member 8 being illustrated and comprising a shank 12 on the post projected through aligned perforations in a pair of washers 13—13 and through the web of the channel form reach member 8, one washer on each side of the web, and the shank 12 being headed over as at 14.

The forward or stem end of the Y-form reach member is, as shown at 15, bent upwardly in side elevation as shown in Fig. 2, and the end thereof is bent as at 16 substantially into parallelism with the frame 1 and is projected under the loop 3. Preferably the web portion 17 of the reach member at this point is pressed or bent inwardly, downwardly as viewed in Fig. 2, between the side flanges 9 thereof to provide a hook at the end of the reach member, and the loop 3, as shown in Fig. 3, is bent inwardly, upwardly as viewed in Figs. 2 and 3, into the channel between the flanges 9—9.

The channel at this portion of the reach member is allowed to fit loosely through the loop 3 but is prevented from undue shifting by the loop 3 projecting thereinto as shown at 18 in Fig. 3, and by the bent web as shown at 19, Figs. 1 and 2, so that the rearward end of the reach member

8 may have an up-and-down hinging movement around the forward end, and so that the forward end of the reach member may be hingingly connected to the frame 1.

In the web portion 20 of the rearward Y legs 21—21 of the reach member, the sheet metal is cut and pressed to provide an upwardly projecting and a downwardly projecting hood 22 and 23, respectively, which provide in effect a diagonal perforation in the web of the reach member, as shown at 24 in Fig. 6, and as indicated in Figs. 1 and 2.

A pair of coil compression wire springs 25—25 connect the legs 21 of the reach member 8 with the saddle frame 1. At the upper ends of these springs, as viewed in Fig. 2, the end of the last convolution 26 of each of the springs is projected under a loop 4. The lower end of the spring has the wire threaded into and through the above mentioned perforation 24. Preferably, the lower end of the spring 25 is first assembled with the reach member 8, by projecting the end of the last convolution through the said perforation 24 and by giving it a screwing or threading movement, disposing one or more complete convolutions 27—27 under the web of the reach member 8 and preferably in the cup-form portions 10—10 thereof; and then the opposite end 26 is inserted under the loop 4.

The convolutions of the spring at their engagement with the reach member, may be so close together that they must be forcedly resiliently spread to screw them into the perforation 24, and thus may tightly grip the reach member, so that in order to project the opposite end 26 under the loop 4, the spring must be given an unwinding torsion putting it under tension, which torsional tension will be relieved when the end 26 has been inserted under the loop 4. Thus, after the springs 25 have been assembled as described, they cannot be disassembled without putting the spring under resilient torsion and thus the resilience of the spring itself maintains the opposite ends of the springs connected respectively to the saddle frame and to the reach member.

The convolution of the spring 25 engaging the upper side of the reach member 8, as shown at 28, may be of small diameter and rest directly upon the reach member.

My invention is not limited to the exact details of construction illustrated and described. Changes and modifications may be made within the spirit of my invention without sacrificing its advantages and within the scope of the appended claims.

I claim:

1. In a cycle or the like saddle, a sheet metal seat element, a loop on a forward portion of the seat element, a pair of loops on a rearward portion of the seat element, a sheet metal reach member having a forward portion oscillatable on the forward loop, and a pair of coil compression springs having one end convolution compressingly reacting on the seat element with the spring ends inserted through the rearward frame loops, the rearward portion of the reach member having spaced portions thereof provided with perforations opposite the rear loops, and the opposite end portions of the springs being of spiral form and rotatingly screwed into the perforations and gripping the reach member between end convolutions of the spring and compressingly reacting on the reach member, the spring ends being retained in the loops and perforations respectively by the torsional resistance of the springs to resist distortion.

2. In a cycle or the like saddle, a rigid seat element, a sheet metal reach member having a forward portion hinged to the forward portion of the seat element, and a pair of spiral coil compression springs having one end convolution compressingly reacting on the seat element, the rearward portion of the reach member being provided with spaced perforations and the other end portions of the springs compressingly reacting on the reach member with the end convolutions of the springs rotatingly screwed into the perforations and gripping the reach member therebetween.

3. A cycle saddle comprising a rigid seat element, a sheet metal reach member connected with the pommel end of the seat element, and spaced from the seat element at the cantle end of the seat element, a plurality of spaced perforations in the sheet metal reach member, and a corresponding plurality of springs having convolutions at one end of spiral form rotatingly screwed into the said perforations and gripping the reach member therebetween and at their opposite ends connected to the seat element, the connection between the springs and reach member being maintained by the inherent torsional resilience of the springs to resist unscrewing of the said convolutions.

4. In a cycle saddle, a rigid seat element, and a reach member of sheet metal having a portion of channel cross-section extending forwardly and projected through a loop on the forward portion of the seat element, an intermediate portion of the loop being bent into the channel between the flanges thereof, and the channel web beyond the loop being bent to provide a loop engaging abutment to maintain the reach member from withdrawal from the loop, providing a generally hinging connection between the reach member and the seat element.

5. In a cycle saddle, a seat element, a metal loop on the element at the forward part thereof, and a sheet metal reach member having a portion of channel cross-section projected through the loop, and the loop being bent inwardly between the channel flanges, the reach member having a generally hinging connection with the element at the loop.

6. In a cycle saddle, a seat element, a metal loop at the forward portion of the element, and a reach member of sheet metal having a portion of channel cross-section projected through the loop, and the channel web beyond the loop being bent to provide a loop engaging abutment to prevent withdrawal of the reach member from the loop, the reach member having a hinging connection with the seat element at the loop.

7. In a cycle saddle, a seat, a reach member of channeled sheet metal extending forwardly and rearwardly below the seat and connected forwardly to the frame, and a saddle post secured to an intermediate portion of the reach member, said reach member at its rear end formed at spaced portions thereof to conform to and to receive in mutually screwed relation therewith an end convolution of a seat supporting spirally coiled wire spring, the end of the spring extending through and beyond the reach member.

8. In a cycle saddle, a seat element, a reach member having a hinging connection with the seat element at the forward portion thereof, the reach member being in the form of a sheet metal web with a depending flange at peripheral portions thereof, and a coiled wire compression spring secured at opposite ends to the seat element and to the reach member, the spring having a convolution of relatively small diameter reacting upon the web of the reach member, and terminal convolutions screw-threaded through a perforation in the reach member web, and through and beyond the reach member the perforation having an axis generally parallel to the terminal convolutions.

9. In a cycle saddle comprising a seat, a pair of seat supporting springs, a saddle seat post, and a reach member, said reach member being of unitary sheet metal construction, and channeled from a front end towards its rear end and being substantially widened towards its rear end, and comprising portions formed at its front end and at both rear end corners adapted to be interconnected to the front bottom portion of the cycle seat and to said springs respectively, said springs yieldingly separating the rear end portions of said seat and said reach member, and each having end convolutions extending through and beyond the reach member and retained in connection therewith by the inherent resiliency of the spring, said post being secured to the intermediate portion of said reach member.

10. In a cycle saddle, a seat, a sheet metal reach member, springs between the reach member and the seat, the reach member having a forwardly and rearwardly extending rib thereon and comprising means at the forward end of the reach member to connect it to the seat and at the rear end having laterally spaced portions connected to each spring by a perforation in the reach member through and beyond which an end portion of the spring is projected, said springs yieldingly separating the rear end portions of the seat and the reach member, and means on an intermediate portion of the reach member for connecting the seat to a cycle.

ROLAND W. FAULHABER.